June 3, 1947.　　　　R. H. F. BOOT　　　　2,421,594
ARC WELDING ELECTRODES
Filed Feb. 21, 1945
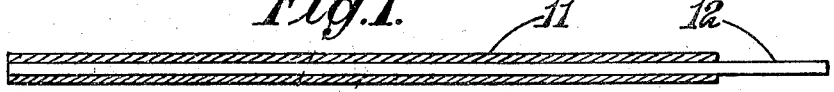
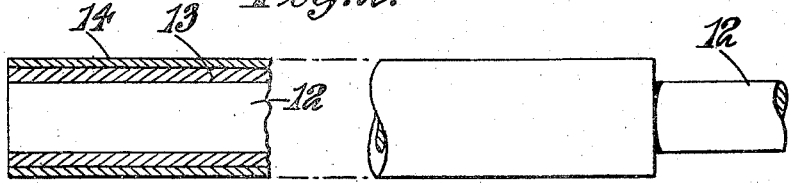
INVENTOR
R. H. F. Boot
By Watson, Cole, Grindle &
　　　　　Watson Patented June 3, 1947

2,421,594

UNITED STATES PATENT OFFICE 2,421,594

ARC WELDING ELECTRODE

Robert Henry Farmer Boot, London, England, assignor to Under Water Welders & Repairers Limited, London, England, a British company Application February 21, 1945, Serial No. 579,023
In Great Britain December 15, 1943

3 Claims. (Cl. 219—8)

This invention comprises improvements in or relating to arc-welding electrodes.

It is an object of the invention to provide an arc-welding electrode suitable for use in welding beneath the surface of liquid as described in United States Patent No. 2,408,175, September 24, 1946.

In welding beneath the surface of aqueous liquids as described in the aforesaid application it is essential to employ an electrode which is not only flux covered but in which the access of water to the electrode by penetration of the flux coating is prevented. Most coating compounds which might be supposed to keep water out of pentration into the flux prove to be incapable of protecting the electrode when it is immersed for a considerable time, especially in sea water, which being impregnated with sodium salts has a high osmotic pressure.

According to the present invention an arc-welding electrode for the purpose described consists of a metal core covered over its working surface with a layer of flux intimately admixed with a tough solid polymer of a vinyl or substituted vinyl compound. Where the polymer is not of itself sufficiently tough (non-brittle) it may be rendered so by admixture with a suitable plasticiser.

The layer of flux which is intimately mixed with the polymer may be in direct contact with the metal core of the electrode or, if desired, it may be disposed over an inner layer of flux not so admixed.

One suitable polymer is polyvinyl chloride ($CH_2=CHCl$) but other vinyl or substituted vinyl compounds may be employed such as polymers of vinyl acetate ($CH_3COOCH=CH_2$), methyl methacrylate ($CH_2=C(CH_3)COOCH_3$), methyl acrylate ($CH_2=CHOOCH_3$) or styrene ($CH_2=CHC_6H_5$)

Preferably over the layer of flux which is intimately mixed with the polyvinyl chloride or other polymer is an outer skin consisting of such a polymer.

The invention includes a process of manufacture of an arc-welding electrode consisting in taking a solution of a tough solid soluble polymer of a vinyl or substituted vinyl compound in a volatile solvent, mixing this with a flux to a paste form, coating a metallic electrode with the paste and hardening by evaporation of the solvent. After coating with the flux mixed with the polymer and hardening thereof the electrode may be dipped in a solution of such a polymer in a volatile solvent so as to cover the surface with an additional continuous layer of the polymer.

Alternatively an electrode according to the invention may be made by taking a metallic electrode, coating it with a non-waterproof porous paste of a flux and drying and thereafter applying to the electrode a solution of a tough solid soluble polymer of a vinyl or substituted vinyl compound in a volatile solvent, the solution being so applied that with the aid of the solvent it penetrates intimately into at least the outer pores of the flux and forms a continuous skin thereover, and drying the compound by evaporation of the solvent. The application of the solution may be effected either by dipping the electrode into the solution or by painting on a sufficiently thick coat to cause the solution, while in liquid form before the solvent has been dried out, to penetrate into the outer layers of the flux and also to form a continuous waterproof external coating. If the compound is applied by spraying, this must be done by a sufficiently high pressure spray to ensure penetration of the coating into the pores of the flux before evaporation of the solvent.

In the accompanying drawing: Figure 1 is a diagrammatic illustration of one form of electrode according to the invention and Figure 2 is a similar view to an enlarged scale of a second form.

Figure 1 shows the type of electrode hereinafter referred to where the flux 11 intimately mixed with the polymer is in direct contact with the core 12.

Figure 2 shows (partly in section) the type in which the core 12 is covered with a layer of flux 13 and admixed with polymer and thereover is a layer of mixed flux 14.

The following is a description by way of example of electrodes manufactured in accordance with the invention and of the process of production thereof:

Example I

Polyvinyl chloride ($CH_2=CHCl$) of a non-brittle soluble grade is taken and dissolved in xylene or toluene so as to produce a solution consisting of 85% solvent and 15% polyvinyl chloride. This solution is mixed with a powdered flux consisting of—

| | Per cent |
|---|---|
| Mineral titanium oxide (rutile) | 45 |
| Kaolin | 10 |
| Ferro manganese alloy (90% manganese and 1% carbon maximum) | 15 |
| Potash (felspar) | 10 |
| Magnesium carbonate (magnesite) | 10 |
| Anhydrous sodium silicate | 5 |
| Magnetic oxide of iron | 5 |

The quantity of solution of polyvinyl chloride and powdered flux is such that an easily workable paste is produced and the electrode is coated with this paste by dipping or extrusion. The extrusion may be done in any ordinary electrode coating apparatus and the coating, on an electrode of the diameter of say five thirty-seconds of an inch, may be of a thickness of one sixteenth of an inch. After the application of the flux the solvent is dried off and the result is a hard impervious flux layer.

After drying the surface is coated with a layer of the polyvinyl chloride applied by dipping the electrode in a solution made up as follows:

|  | Per cent |
|---|---|
| Polyvinyl chloride | 15 |
| A plasticiser consisting of equal parts of dibutyl phthalate and tricresyl phosphate | 5 |
| Benzene or toluene | 80 |

The total quantity of polyvinyl chloride and plasticiser in the completed coating of the electrode may be of the order of 20% to 25% reckoned on the weight of the flux present.

The result is an electrode coated with a hard impervious flux layer which will not deteriorate or permit electrolysis at the metal surface of the core even if it is immersed in water for a long time.

*Example II*

In this case an electrode is taken which is coated with a porous and non-waterproof layer of flux, one made in the usual way by mixing the flux ingredients with water to paste form, applying in the usual extrusion apparatus and drying.

Thereafter the electrode is painted over or dipped in a solution of polyvinyl chloride, made up as follows:

|  | Per cent |
|---|---|
| Polyvinyl chloride | 15 |
| A plasticiser consisting of equal parts of dibutyl phthalate and tricresyl phosphate | 5 |
| Benzene or toluene | 80 |

If the compound is painted on an adequate quantity must be employed to penetrate intimately at least into the outer pores of the flux and if the compound is applied by dipping the electrode must be kept in the solution for a sufficient time to ensure intimate penetration. Upon drying the coating of polyvinyl compound not only forms an intimately adherent layer where it is mixed with a flux, which layer overlies an inner layer of flux not admixed with the polyvinyl compound, but in addition there is a skin of the polyvinyl compound on the outer surface of the electrode which is continuous and water-resistant. The properties of the electrode from the user's point of view are similar to what has already been described in connection with Example I hereof.

*Example III*

In this case instead of using polyvinyl chloride, polymerised methyl methacrylate is employed. Methyl methacrylate is a substituted vinyl derivative, having the hydrogen in the vinyl radical $$CH_2=CH-$$

substituted by a $CH_3$ group, and of the following formula $$CH_2=C(CH_3)COOCH_3$$

A suitable commercial form of this body is that sold, already mixed with plasticiser and some solvent, under the trade name "Welvic." This solution is of a treacly consistency and further solvent (benzene or toluene or xylene) is added to thin the solution to the consistency of an easily flowing liquid, when the composition will be approximately as follows:

|  | Per cent |
|---|---|
| Methyl methacrylate | 15 |
| Plasticiser | 5 |
| Solvent | 80 |

Electrodes, already coated with flux of the composition set forth in Example I, are dipped in this solution, allowed to soak for about fifteen minutes, removed and dried.

I claim:

1. An arc-welding electrode consisting of a steel core covered over its working surface with a layer of flux and over the flux a continuous outer skin of a tough solid polymer selected from the class consisting of vinyl and substituted vinyl compounds, the layer of polymer being intimately mixed with the flux at the interface between the two layers.

2. An arc-welding electrode as claimed in claim 1, wherein the polymer is polyvinyl chloride.

3. An arc-welding electrode as claimed in claim 1, wherein the polymer is methyl-methacrylate.

ROBERT HENRY FARMER BOOT.

REFERENCES CITED

The following references are of record in the file of this patent:

UNITED STATES PATENTS

| Number | Name | Date |
|---|---|---|
| 1,324,227 | Carpenter | Dec. 9, 1919 |
| 1,354,476 | Fay | Oct. 5, 1920 |
| 1,871,257 | Cadwell | Aug. 9, 1932 |
| 1,931,466 | Notvest | Oct. 17, 1933 |
| 1,954,394 | Meisse | Apr. 10, 1934 |
| 1,998,947 | Weed | Apr. 23, 1935 |
| 2,158,984 | Lytle et al. | May 16, 1939 |